United States Patent [19]

Forcht et al.

[11] Patent Number: 4,490,184
[45] Date of Patent: Dec. 25, 1984

[54] CORROSION RESISTANT THERMAL CONTROL MATERIAL AND PROCESS

[75] Inventors: Brennan A. Forcht; Gerald F. Thomas, both of Arlington, Tex.

[73] Assignee: LTV Aerospace and Defense Co., Dallas, Tex.

[21] Appl. No.: 422,134

[22] Filed: Sep. 23, 1982

[51] Int. Cl.³ .............................................. G02B 5/08
[52] U.S. Cl. ................................... 148/6.21; 427/162; 204/19; 204/38 A; 350/642; 148/6.27
[58] Field of Search .................... 148/6.27, 6.21, 6.24; 427/162; 428/469; 350/288; 204/29, 38 A, 19

[56] References Cited

U.S. PATENT DOCUMENTS 4,364,995 12/1982 Crawford et al. ............... 428/472 X

FOREIGN PATENT DOCUMENTS 110203 8/1980 Japan .................................. 350/600
197806 11/1976 Switzerland ...................... 350/641

OTHER PUBLICATIONS

Applied Optics, vol. 14, No. 11, 11/75, pp. 2639–2644.

Primary Examiner—Sam Silverberg
Attorney, Agent, or Firm—S. S. Sadacca; J. M. Cate

[57] ABSTRACT

A material and process for preparing corrosion resistant reflective material. The process in the preferred embodiment comprises abrading a metal substrate, anodizing the metal substrate, depositing a thin film of substantially pure metal on the anodized substrate, and covering the reflective metal with a protective organic coating. The material produced is a metallic substrate having an anodized layer with a relatively thin film of reflective metal covered by a protective organic coating.

8 Claims, 1 Drawing Figure

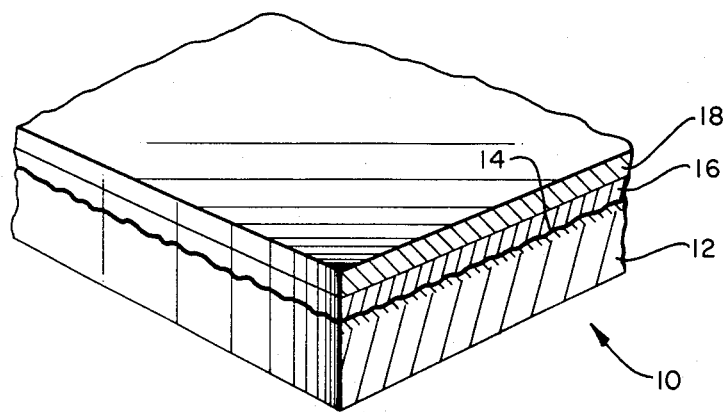

CORROSION RESISTANT THERMAL CONTROL MATERIAL AND PROCESS

TECHNICAL FIELD

This invention relates to corrosion resistant thermal control materials and more particularly to corrosion resistant thermal control materials which are reflective and a process for manufacturing same.

BACKGROUND ART

Metallic structures are treated in numerous ways to prevent or minimize corrosion, such as painting, sealing or anodizing. The corrosion of metallic substances is the deterioration of the substance from reaction with the environment. The most common type of corrosion is oxidation. In selecting the method to protect the metallic structure from corrosion, consideration must be given to the conditions of use, particularly the environment to be encountered and how the method chosen for corrosion protection will affect the functioning of the structure.

The protection of metallic substances by anodizing them is generally economical. The corrosion of metallic substances is related to the metal's conductivity, impurities present, temperature, and oxygen levels. Anodizing slows the rate of corrosion by creating an oxide film on the metallic surface which acts as an anode which resists oxidation. Some metallic substances such as aluminum alloys will to a certain extent naturally form a protective oxide coating. Anodizing while providing corrosion resistance, is undesirable for some applications where the structure must be reflective because anodizing the surface increases absorption of radiation energy. For example, where a metallic surface is to be utilized as a mirror for concentrating solar energy it is desirable that the maximum reflectivity of the surface be maintained to prevent heat absorption by the metallic structure. As a result, the temperature rise in the metallic structure is minimized, and maximum energy is reflected to the desired point.

Thus, there has remained a continuing need to provide a highly reflective surface which exhibits good corrosion resistance.

SUMMARY OF THE INVENTION

In one aspect the present invention provides a corrosion resistant thermal control material comprising an anodized metallic substrate upon which a thin film of a substantially pure metal is applied to the anodized surface of the metallic substrate. In a preferred embodiment the corrosion resistant thermal control material is made of an anodized metallic substrate upon which a thin film of a substantially pure metal has been applied to the anodized surface of the metallic substrate, and the thin film has been polished to provide a reflectance of above about 95% which is thereafter coated with a clear protective coating. In the most preferred embodiment the material is comprised of an anodized aluminum alloy substrate upon which a thin film of from about 3 to about 15 mils of substantially pure aluminum has been flame spray deposited. This sprayed pure aluminum film is then polished to above about 95% reflectance and coated with a suitable protective organic coating.

In another aspect, the present invention relates to a process for manufacturing the corrosion resistant thermal control material which comprises the steps of anodizing the metallic substrate, coating the metallic substrate with a substantially pure metal. In a preferred embodiment the process includes the steps of anodizing the metallic substrate, coating the metallic substrate with a thin film of substantially pure metal, and coating the thin film of substantially pure metal with a protective organic coating.

In the most preferred embodiment the process includes the steps of anodizing the metallic substrate, coating the metallic substrate with a substantially pure metal by flame spraying, polishing the pure metallic surface to a reflectance of above about 95% and coating the polished pure metallic surface with a protective organic coating.

The process of the present invention produces a material with a high reflective surface and good reflective properties. The present invention allows a metal alloy to be used for economy and structural strength while obtaining high reflectance with a substantially pure metal surface, the combination having low radiation energy adsorption with good corrosion resistance.

BRIEF DESCRIPTION OF THE DRAWINGS

The FIGURE is a perspective view of the present invention in cross-section.

DETAILED DESCRIPTION

Reflectance of incident radiant energy is an efficient means of thermally controlling a component's temperature. In addition, high reflectance permits radiant energy to be reflected and concentrated at a desired location, for example, utilizing mirrors to focus sunlight upon a boiler. High reflectance over a board range of wave lengths can be obtained by buffing, polishing or burnishing the metallic surface of the component. Unless this surface is protected the stability of the reflective polished metallic surface is poor. Exposure to the environment either leads to tarnishing of the reflective surface or to corrosion attack sufficiently harsh to structurally damage the component. The present invention is directed to a material and process for manufacturing the material which minimizes corrosion and maintains effective reflectivity of the surface.

The FIGURE illustrates a typical cross-section of the preferred embodiment of the present invention.

The FIGURE shows a perspective view of a component 10 in cross-section. The component has a metallic substrate 12 which has an anodized layer at its surface 14 which is indicated as a rough surface. The drawing is not to scale. Deposited on the anodic surface of metallic substrate 12 is a thin film of substantially pure metal 16. This film has preferably been polished to a reflectance of above about 95%. Applied to the surface of thin metallic coating 16 is a clear protective organic coating 18.

The metallic substrate 12 may be any metal or metal alloy which can be anodized, such as aluminum alloys, or titanium alloys. Virtually any aluminum alloy can be utilized for the substrate, such as American Aluminum Association ("ASA") 7075, 2024, 6061, 5052, 7050, 7049, 7475, 2219, 1100, 1060, 2011, 2014, 2017, 2018, 2025, 2117, 3003, 3004, 4032, 5005, 5050, 5056, 5154, 5357, 6053, 6063, and 6151. In the preferred embodiment aluminum alloys are employed for reasons of economy and strength. Substrate 12 normally will be a structural member. Substrate 12 is preferably a metal alloy in order to employ the improved strength characteristics or other desired characteristics of the alloy. Metal alloys are, in general, more susceptible to corrosion than pure metals, thus anodic layer 14 of substrate 12 is utilized to protect the substrate from corrosion. High reflectance is achieved by coating the anodic layer of substrate 12 with a thin metallic film 16 of a substantially pure metal. This film 16 is thin enough to permit the anodic layer 14 to resist corrosion of the thin film 16 as well as the substrate 12, thereby imparting some corrosion resistance to the thin film 16, however, thin film 16 is thick enough to allow polishing or buffing to about 95% reflectance. Films ranging in thickness from about 3 mils to about 15 mils have been found suitable. In general, thin film 16 should be of a substantially pure metal with purity above about 96% and most preferably above about 99%. This thin film of substantially pure metal in combination with the anodic layer 14 is very corrosion resistant. Tarnishing of the polished surface of thin film 16 is prevented by application of a thin clear protective organic coating 18.

The thin metallic coating 16 is a substantially pure metal which has been spray deposited. The metal may be any metal which upon buffing or polishing gives a highly reflective surface. The reflectance should be above 95%, preferably above 96%, and most preferably above 98%. Reflectance can be measured with a Perkin-Elmer Model 225 infrared spectrophotometer with model 186-0445 reflectance attachment or 186-0373 reflectance attachment. Preferred metals include aluminum, nickel, molybdenum, copper, gold and silver. For economic reasons aluminum is preferred. The selection of the metal for thin film 16 is also effected by the wavelength of energy to be reflected. For example, it can be desirable to select a metal which has the greatest reflectance for the wave length to be reflected. In general, the thin metal film does not have to be the same metal as utilized for the metallic substrate.

The thin protective organic coating 18 may be any suitable organic coating which is clear and adheres well to the metal of the thin film 16 such as an acrylic lacquer. It is preferred that the protective organic coating be thin, and substantially impermeable to water. The organic coating may be of natural or synthetic compounds.

The highly reflective corrosion resistant material of the present invention was produced by the following method. The method of the present invention is illustrated by the description of the process wherein an aluminum alloy substrate is employed. Those skilled in the art will recognize that the conditions in the anodizing process will be governed by the substrate selected. The substrate material such as aluminum alloy, for example, ASA 7075, is first prepared by cleaning any impurities and oxides off the surface by a suitable method. Dry grit blasting is preferred with about a 325 mesh garnet or finer grit. Grit blasting with 325 mesh garnet yields a surface with from about 16 to about 32 microinch rms (root mean square) finish. In the preferred process, the surface is abraded to provide a rough surface with less than about 32 microinch rms finish. Other methods can be used which remove impurities from the surface of the metal alloy can be used within the scope of the invention.

After the surface has been cleaned of impurities it is degreased with a suitable degreaser, such as vapors of 1,1,1 trichloroethane (inhibitive). This procedure may be eliminated if there is no opportunity for the contamination of the cleaned surface prior to alkaline cleaning.

The substrate material is then cleaned with an alkaline solution. Any alkaline cleaning method known in the art may be utilized. For example, immersing the substrate in a solution of three ounces of disodium phosphate per gallon of water for ten minutes at a temperature in the range of from 140° F. to about 160° F. has been found sufficient.

The next procedure in the anodizing process is to deoxidize the surface in an aqueous solution of acid. When treating aluminum alloy substrates a deoxidier solution of about 10 gallons of nitric acid (42° baume) per 100 gallons of water, from 10 to about 12 ounces of hydrofluosilicic acid (from about 27% to about 30% concentration) and about 13.3 ounces of an alkyl sulfonate wetting agent such as Nacconal NR sold by Allied Chemical Corporation. The substrate is immersed in the deoxidizer solution for a sufficient period of time to deoxidize the surface.

The surface of the substrate is anodized after the surface has been deoxidized. Anodizing can be performed by any conventional method and with any conventional reagents. When processing aluminum alloy substrates an anodizing bath of sulfuric acid or chromic acid is preferred. Sulfuric acid has been found to give a thicker and harder oxide layer and when combined with a dichromate rinse improves corrosion resistance. Anodizing of aluminum alloy substrates can be accomplished in a solution of from about 9% to about 11% by volume of 66° baume sulfuric acid or from about 5 to about 5.1% by weight of chromic acid at a current density from about 10 to about 14 amp/ft$^2$.

After the substrate has been anodized it is removed from the bath, rinsed with deionized water and dried. Preferably this is done in a dust free environment. Corrosion resistance of the sulfuric anodize is improved by sealing with a solution from about 5% to about 6% by weight of potassium dichromate in deionized water and at a temperature in the range of from about 190° F. to about 210° F.

The anodized substrate is then coated with a thin layer of a substantially pure metal above about 95% pure and preferably above about 99% pure. The metal is preferably applied by flamespray application techniques. Flame-spray techniques are known and are preferred because the molten atomized metal flows into the cavities produced by the anodizing and the grit blasting to form an excellent mechanical bond to the corrosion resistant anodic layer. It has been found that the bond is more reliable where the substrate has been abraded for example by grit blasting to produce a slightly rough surface which is later anodized, rather than merely coating the anodic layer of a substrate which has not been grit blasted. The surface must not be deeply abraded, otherwise polishing the thin film of substantially pure metal may penetrate the thin film at the asperites. Thus, it is preferred to grit blast the substrate. Further, the flame spraying should be conducted in an inert atmosphere to prevent oxidation and contamination of the substantially pure metal.

After the thin layer of substantially pure metal has been applied it is then polished to a high reflectance above about 95% and preferably above 96% and most preferably above 98%. This may be accomplished by known polishing techniques. For example, aluminum may be polished by use of a cotton fabric buffing wheel and aluminum oxide abrasive.

A protective organic coating in a thin transparent coating is applied to prevent tarnishing of the polished metal surface.

Although the preferred embodiment of the present invention has been described in detail, it should be understood that various changes, substitutions and alterations can be made herein without departing from the spirit and scope of the invention as defined by the appended claims.

We claim:

1. The process of preparing a corrosive resistant reflective material comprising the steps of:
    (a) abrading a metallic substrate to produce a slightly rough surface;
    (b) anodizing said metallic substrate;
    (c) depositing a thin film of a substantially pure metal upon the anodized substrate;
    (d) polishing said thin film of substantially pure metal to reflectance above about 95%; and
    (e) coating said reflective metal with a protective organic coating.

2. The process of claim 1 wherein said substantially pure metal is flame sprayed deposited in an inert atmosphere.

3. The process of claim 1 wherein said metallic substrate is an aluminum alloy and said substantially pure metal is aluminum above about 95% pure.

4. The process of claim 3 wherein said thin film of substantially pure metal is from about 3 mils to about 15 mils thick.

5. The process of claim 1 wherein said slightly rough surface has variations less than about 32 microinch rms.

6. The process of claim 5 wherein said substantially pure metal is selected from the group consisting of aluminum, copper, silver, gold, nickel and molybdenum.

7. The process of claim 6 wherein said thin film of substantially pure metal is from about 3 mils to 15 mils thick.

8. The process of claim 7 wherein said thin film of substantially pure metal is flame-spray deposited in an inert gas atmosphere.

* * * * *